United States Patent
Rhodes

(10) Patent No.: US 6,581,273 B1
(45) Date of Patent: Jun. 24, 2003

(54) HEAT EXCHANGER TUBE WEAVING APPARATUS AND METHOD

(75) Inventor: Richard O. Rhodes, San Francisco, CA (US)

(73) Assignee: Fafco Inc., Redwood City, CA (US)

(*) Notice: Subject to any disclaimer, the term of this patent is extended or adjusted under 35 U.S.C. 154(b) by 0 days.

(21) Appl. No.: 09/498,312

(22) Filed: Feb. 4, 2000

(51) Int. Cl.[7] ................................................. B23P 15/26
(52) U.S. Cl. ....................... 29/726.5; 29/726; 29/33 G; 29/33 T
(58) Field of Search ............................... 29/726, 726.5, 29/890.047, 890.043, 466, 467, 723, 33 G, 33 K, 33 T, 890.045; 209/517, 518; 414/745.3, 745.7; 139/192

(56) References Cited

U.S. PATENT DOCUMENTS

| | | | |
|---|---|---|---|
| 2,133,932 A | * | 10/1938 | Whistler et al. |
| 2,154,855 A | * | 4/1939 | Lear |
| 3,023,608 A | * | 3/1962 | McConnell ............... 414/745.7 |
| 3,406,838 A | * | 10/1968 | Davidson |
| 3,630,392 A | * | 12/1971 | Cintract ................... 414/745.7 |
| 3,789,479 A | * | 2/1974 | Zifferer et al. |
| 4,382,329 A | * | 5/1983 | Takaoka et al. ............... 29/726 |
| 4,616,390 A | * | 10/1986 | MacCracken .......... 29/890.047 |
| 4,632,618 A | * | 12/1986 | Issakainen ............... 414/745.7 |
| 4,649,632 A | * | 3/1987 | Schoenig, Jr. et al. |
| 5,083,372 A | * | 1/1992 | Polutnik et al. |
| 6,220,812 B1 | * | 4/2001 | Bordignon et al. ...... 414/745.7 |

* cited by examiner

Primary Examiner—Gregory Vidovich
Assistant Examiner—T. Nguyen
(74) Attorney, Agent, or Firm—Beyer Weaver & Thomas, LLP

(57) ABSTRACT

A weaving apparatus used to separate the tubes of a heat exchanger so that spacers that hold the tubes apart can be inserted between the tubes to increase thermal efficiency. The weaving apparatus includes a frame assembly and a weaving mechanism contained within the frame assembly. The weaving mechanism includes an alignment plate to align the tubes and separation plates to separate the tubes after they have been aligned. The weaving apparatus thus automates the step of separating the tubes of the heat exchanger so that the spacer can ready inserted between the tubes.

18 Claims, 8 Drawing Sheets

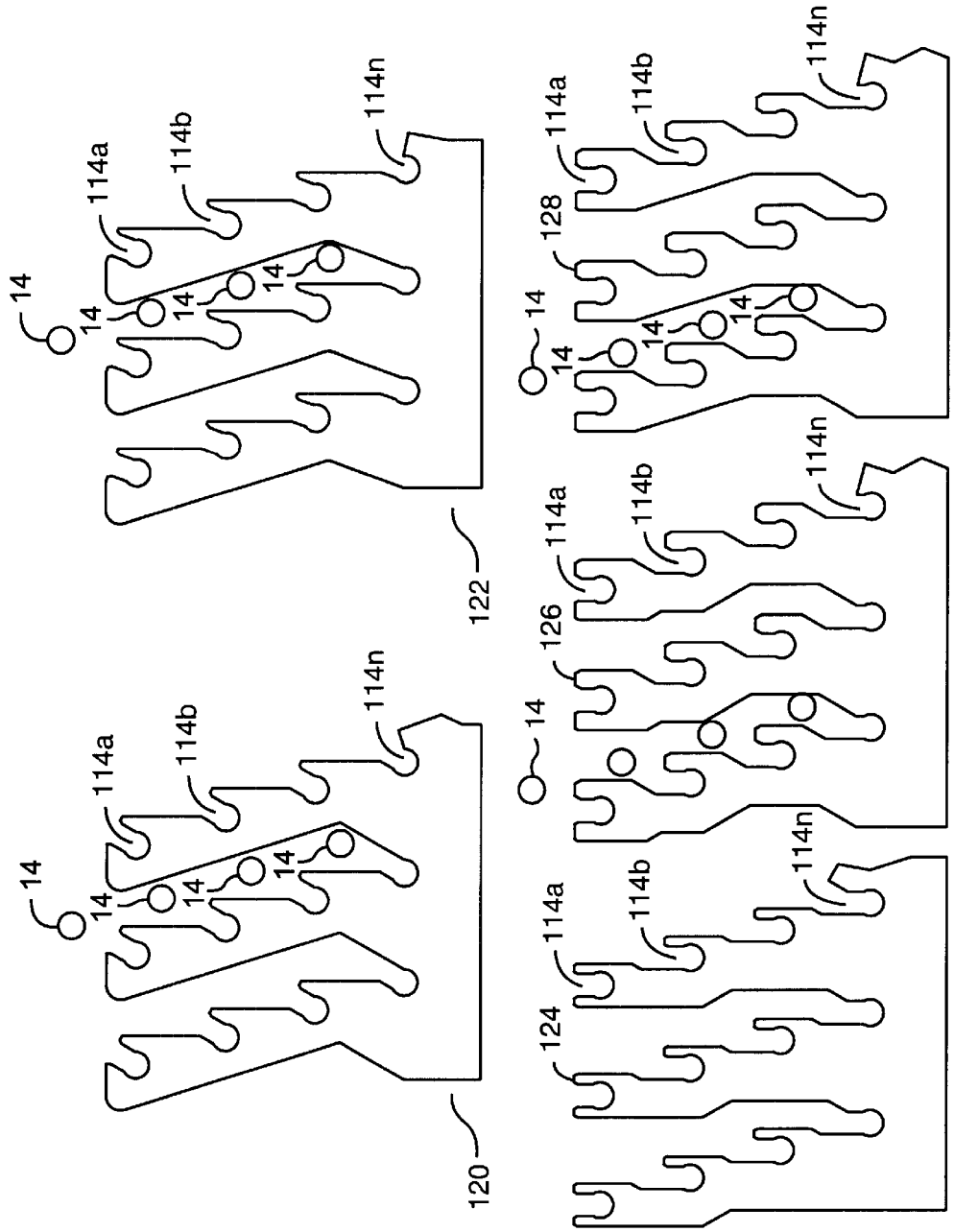

HEAT EXCHANGER TUBE WEAVING APPARATUS AND METHOD

BACKGROUND OF THE INVENTION

1. Field of Invention

The present invention relates generally to heat exchangers, and more particularly, to a weaving apparatus and method used to separate the tubes of a heat exchanger so that spacers that hold the tubes apart can be inserted between the tubes to increase thermal efficiency.

2. Description of the Related Art

Heat exchangers are devices used to quickly and efficiently either cool or heat a gas or liquid (hereafter generically referred to as a "fluid"). A typical heat exchanger includes a pair of header pipes and a plurality of heat exchanger tubes arranged substantially in parallel and adjacent to one another between the header pipes. During operation, fluid is introduced into one of the header tubes. The fluid then travels through the plurality of heat exchange tubes and then passes through the second header pipe to exit the heat exchanger. With a heat exchanger used to cool a hot fluid, the tubes are maintained in a cooling environment. As the hot fluid passes through the heat exchanger, it is cooled by heat transfer through the tubes. With heat exchangers that heat a fluid, the tubes are maintained in a hot environment and the fluid is warmed by heat transfer through the tubes. In general, the larger the heat transfer surface area of the exchanger, the more efficient the device. For this reason, heat exchangers tend to have a large number of tubes.

The heat exchangers offered by FAFCO Incorporated, Redwood City, Calif., assignee of the present application, have heat exchange tubes made of a thermoplastic material heat welded to the header tubes. When these devices are initially manufactured, the heat exchange tubes are tack-welded together before being welded to the header tubes. This arrangement, however, is less than ideal. The tack-welds between the tubes reduce the overall performance of the heat exchanger because they prevent the free flow of the external environment (typically either a gas or a liquid) from circulating around the tubes. To remedy this problem, the tack-welds between the pipes are broken and spacers are inserted between the tubes forming multiple rows of separate tubes. The spacers physically separate the tubes from one another increasing the circulation around the tubes. For more information on FAFCO's heat exchangers, see U.S. patent application Ser. No. 09/220,639 entitled "Heat Exchanger Having Heat Exchange Tubes with Angled Heat-Exchange Performance Improving Indentations, filed Dec. 24, 1998 and U.S. patent application Ser. No. 09/094,187, now U.S. Pat. No. 6,038,768 entitled "Method and Apparatus for Coupling Panel Boards and Tubing to a Header Pipe" filed Jun. 9, 1998, both assigned to the assignee of the present invention and incorporated by reference herein.

The problem with the aforementioned heat exchangers is that the steps of breaking the tack-welds and inserting the spacers are performed manually. Given the large number of tubes per heat exchange unit and their relatively small diameter, this is a very time consuming, labor intensive, expensive process. A weaving machine and method that automates the separation of the tubes is therefore needed.

SUMMARY OF THE INVENTION

The present invention relates to a weaving apparatus used to automate the separation and spacing of the tubes of a heat exchanger so that spacers that hold the tubes apart can be inserted between the tubes to increase the thermal efficiency of the heat exchanger. The weaving apparatus includes a weaving mechanism having an alignment plate to align the tubes and separation plates to separate the tubes after they have been aligned. During operation, the heat exchange tubes to be separated are inserted into the weaving mechanism. The alignment plate then acts to align the tubes. Once aligned, the tubes are separated by the separation plates so that an operator can readily insert the spacer between the tubes to hold them apart. The present invention therefore eliminates the aforementioned step of separating the tubes manually thus significantly reducing the labor, time and cost required to insert spacers between the tubes of the heat exchanger.

DESCRIPTION OF THE DRAWINGS

The invention may best be understood by reference to the following description taken in conjunction with the accompanying drawings in which:

FIG. 8 is a front view of several spacers that can be used to hold the tubes of the heat exchanger apart after the tubes are separated by the weaving apparatus of the present invention.

DESCRIPTION OF THE EMBODIMENTS

Figure 1A:
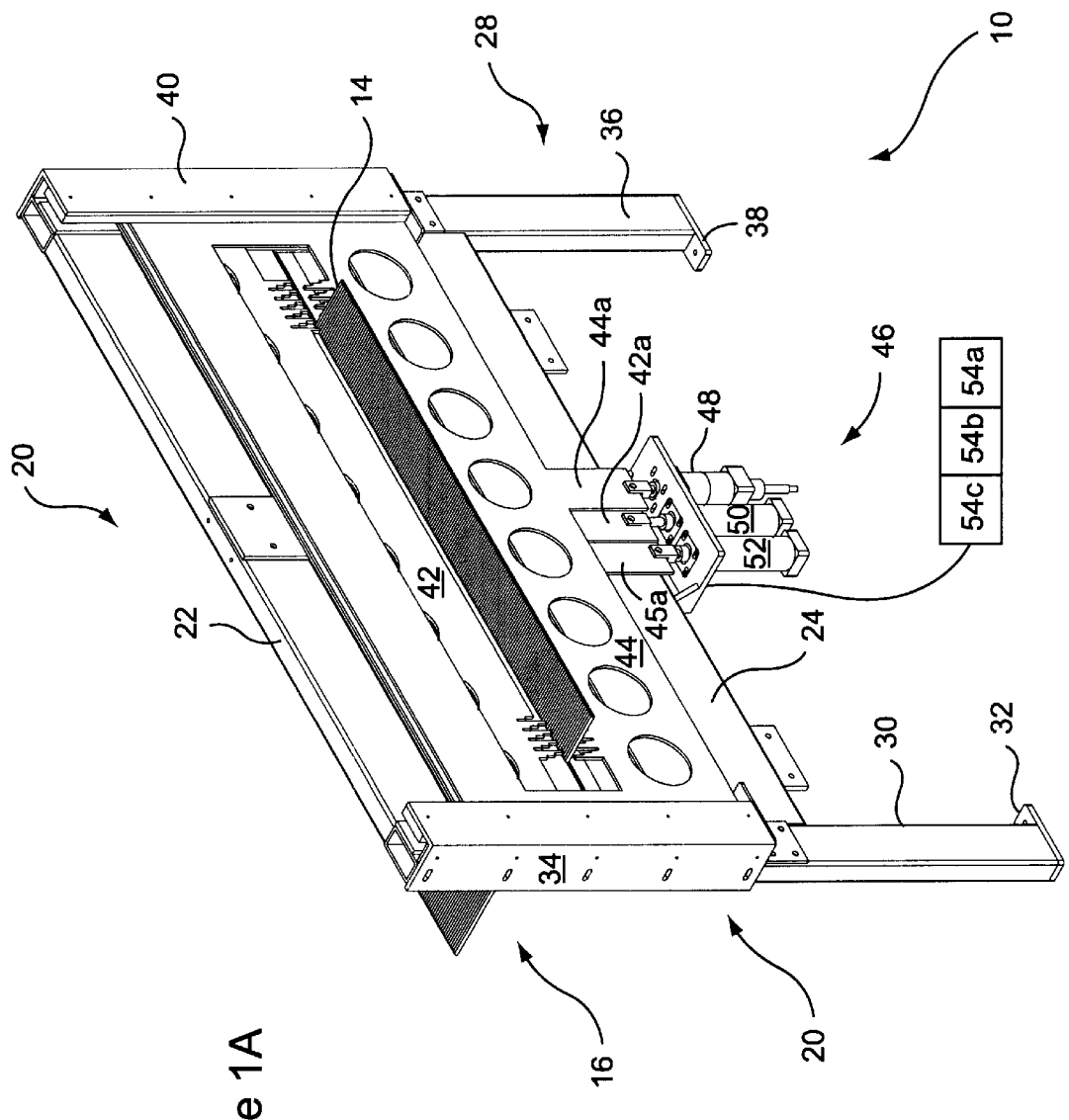
FIG. 1A front perspective view of the weaving apparatus of the present invention.

Referring to FIG. 1, the weaving apparatus 10 performing a weaving operation on the tubes 14 of a heat exchange unit 16 is shown. The weaving apparatus 10 includes a frame assembly 20 including a top cross member 22, a bottom cross member 24, a first side member 26 and second side member 28. The first side member 26 includes a first support structure 30, a first base structure 32, and a first guide mechanism 34. The second side member 28 includes a second support structure 36, a second base structure 38, and a second guide mechanism 40. A first tube separator plate 42 and a second tube separator plate 44 are provided within the frame assembly 20. The guide mechanisms 34 and 40, which are positioned on opposite sides of the frame assembly, are used to maintain the first separator plate 42 and the second separator plate 44 within the frame assembly 20. An alignment plate 45 is also provided within the frame assembly 20 and within the guide mechanisms 34 and 40 (note since the alignment plate 45 is behind the first separator plate 42 and the second separator plate 44, it is only partially visible in FIG. 1A). An actuator mechanism 46 is used to control the movement of the first separator plate 42, the second separator plate 44 and the alignment plate 45 within the guide mechanisms 34 and 40. The actuator mechanism 46 includes three pneumatic cylinders 48, 50, 52 and switches 54a, 54b, 54c mechanically coupled to the second separator plate 42, the first separator plate 44, and the alignment plate 45 respectively. The first and second support structures and 36 are used to support the frame assembly 20. The first and second base structures 32 and 38 are used to bolt or otherwise fasten the weaving apparatus 10 in a stationary position, for example to the floor of a manufacturing or assembly facility. The actuator mechanism 46, under the control of switches 54b and 54a, is configured to selectively position the first separator plate 42 and the second separator plate 44 between tube separation positions and reset positions within the guide mechanisms 34 and 40 of the frame assembly 20 respectively.

Figure 1B:
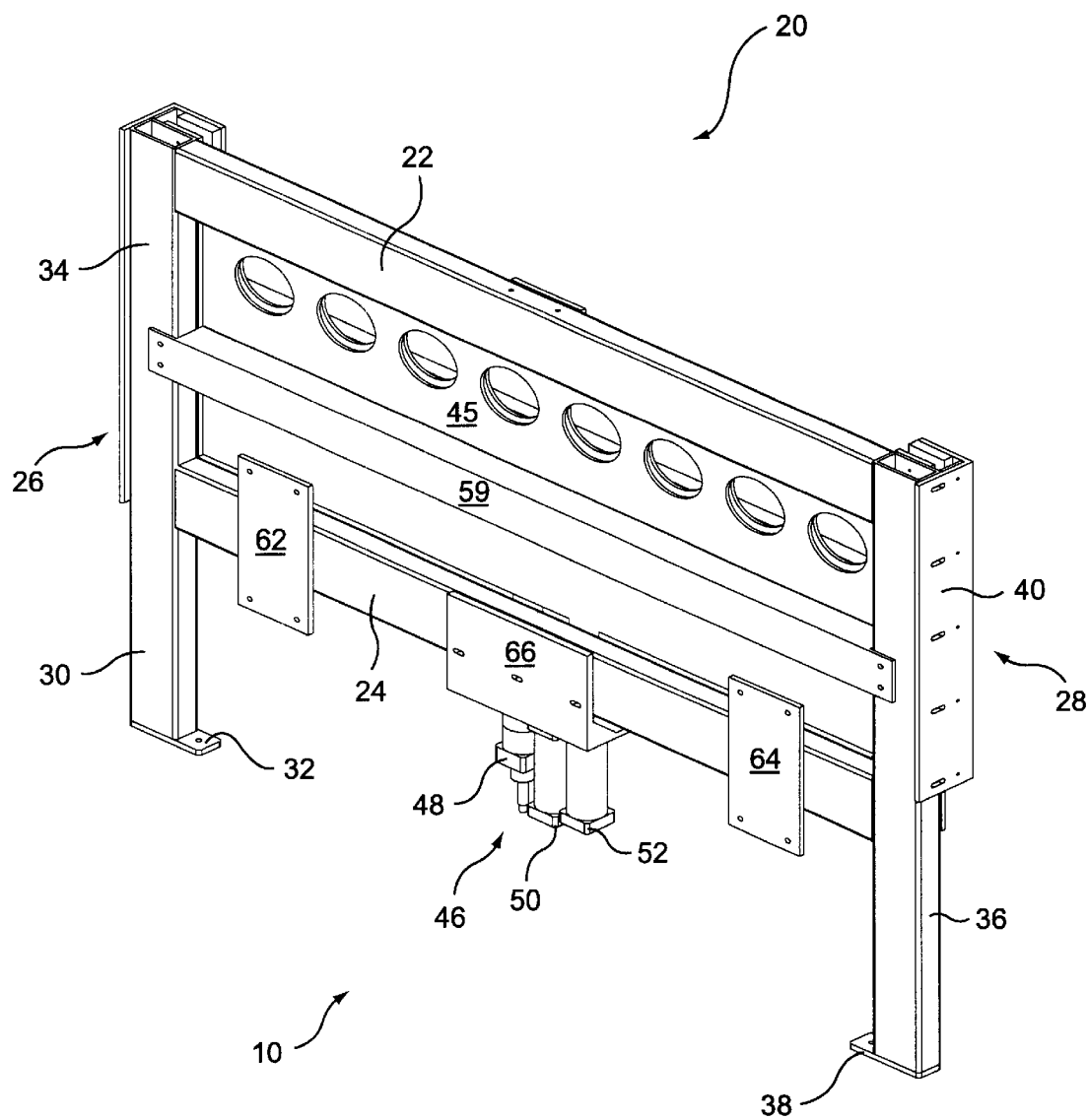
FIG. 1B is a back perspective view of the weaving apparatus of the present invention.

Referring to FIG. 1B, a back perspective view of the weaving apparatus of the present invention is shown. (For the sake of clarity, the weaving apparatus 10 in FIG. 1B is shown without the heat exchange unit 16.) The back perspective view shows many of the same elements of the weaving apparatus 10 as illustrated in FIG. 1A and therefore are labeled with the same reference numerals and will not be discussed in detail herein. The back perspective view of the weaving apparatus 10 shows a structural cross member 59 mechanically coupled between the first and second guide mechanisms 34 and 40, brackets 62 and 64 mounted to bottom cross member 24 for securing the weaving apparatus 10 to a work bench, and a plate 66 which mounts the three pneumatic cylinders 48, 50, 52 to bottom cross member 24. Also shown is the alignment plate 45 in position behind the first tube separator plate 42 and the second separator plate 44 within the frame assembly 20. The pneumatic cylinder 52 is mechanically coupled to the alignment plate 45 and is configured to selectively position the alignment plate 45 between a tube alignment position and a reset position within the guide mechanisms 34 and 40 of the frame assembly 20.

Figure 2:
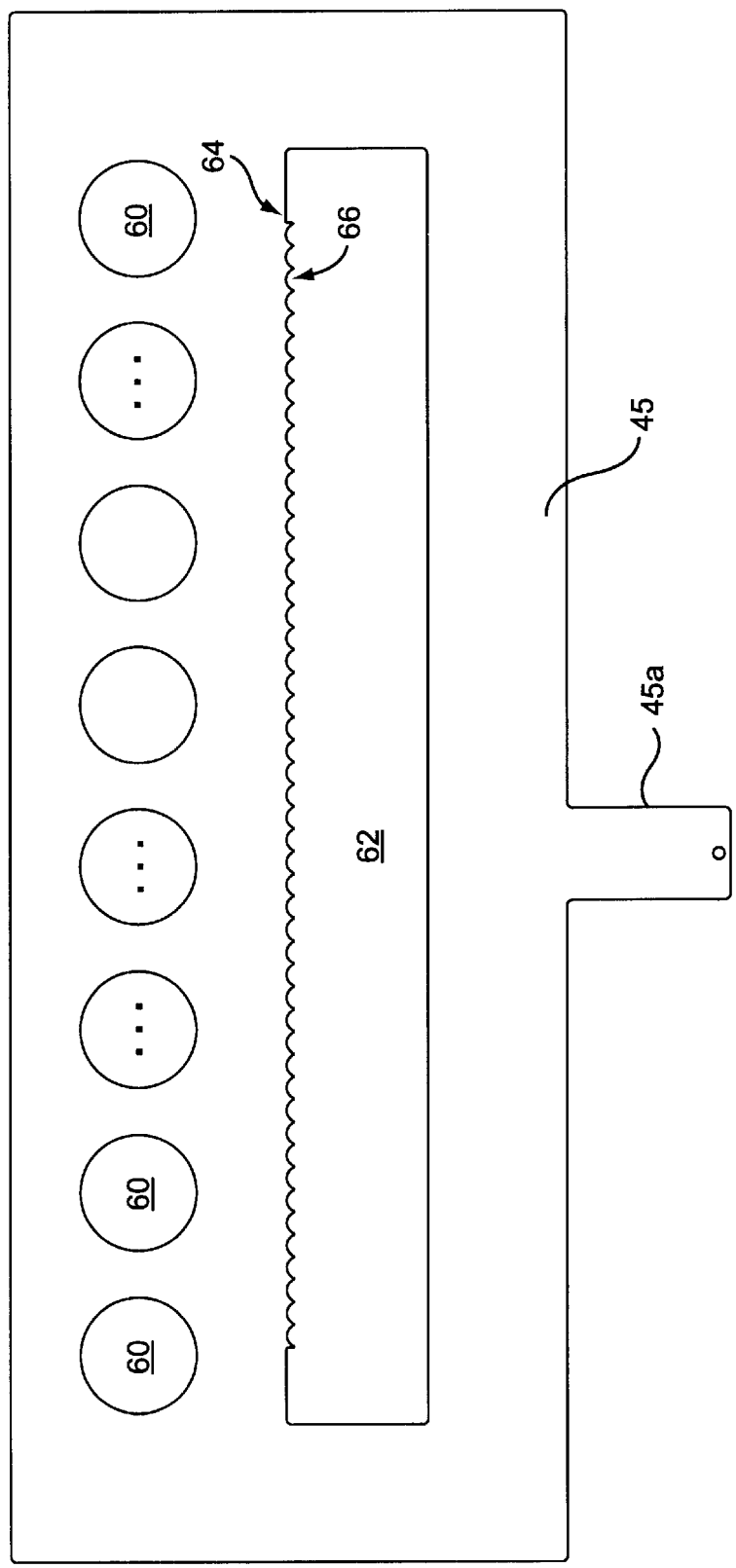
FIG. 2 is a front view of an alignment plate used in the weaving apparatus of the present invention.

Referring to FIG. 2, a front view of the alignment plate 45 used in the weaving apparatus of the present invention is shown. The alignment plate 45 is rectangular in shape and includes a plurality of round recess regions 60 for reducing the overall weight of the plate 45 and a rectangular shaped recess region 62. The top edge 64 of the recess region 62 defines a tube alignment plane that includes a plurality of circular or V-shaped alignment notches 66 configured to receive the individual tubes 14 of the heat exchanger 16 respectively. (Note the alignment notches 66 as illustrated are shown in larger proportion relative to the other features of the alignment plate 45 for the sake of illustration) In one embodiment, the number of alignment notches 66 matches or exceeds the number of tubes 14 of the heat exchanger 16 inserted into the weaving apparatus 10 and the size of the notches 66 are sufficiently large to accommodate the diameter of the tubes 14. In various embodiments of the invention, the alignment plate 45 has a width ranging from 48 inches to 60 inches, a height ranging from 12 inches to 24 inches, and the top edge 64 includes anywhere from 200 to 400 alignment notches 66 each having a radius in the range of 0.63 to 0.5 inches. A paddle-like member 45a extending from the bottom of the alignment plate 45 is used to mechanically couple the alignment plate 45 to the pneumatic cylinder 52 as best illustrated in FIG. 1A. As previously noted, the pneumatic cylinder 52 under the control of switch 54c causes the alignment plate 45, and consequently the alignment notches 66, to move down to an alignment position and up to a reset position within the guide mechanisms 34 and 40 of the frame assembly 20.

Figure 3:
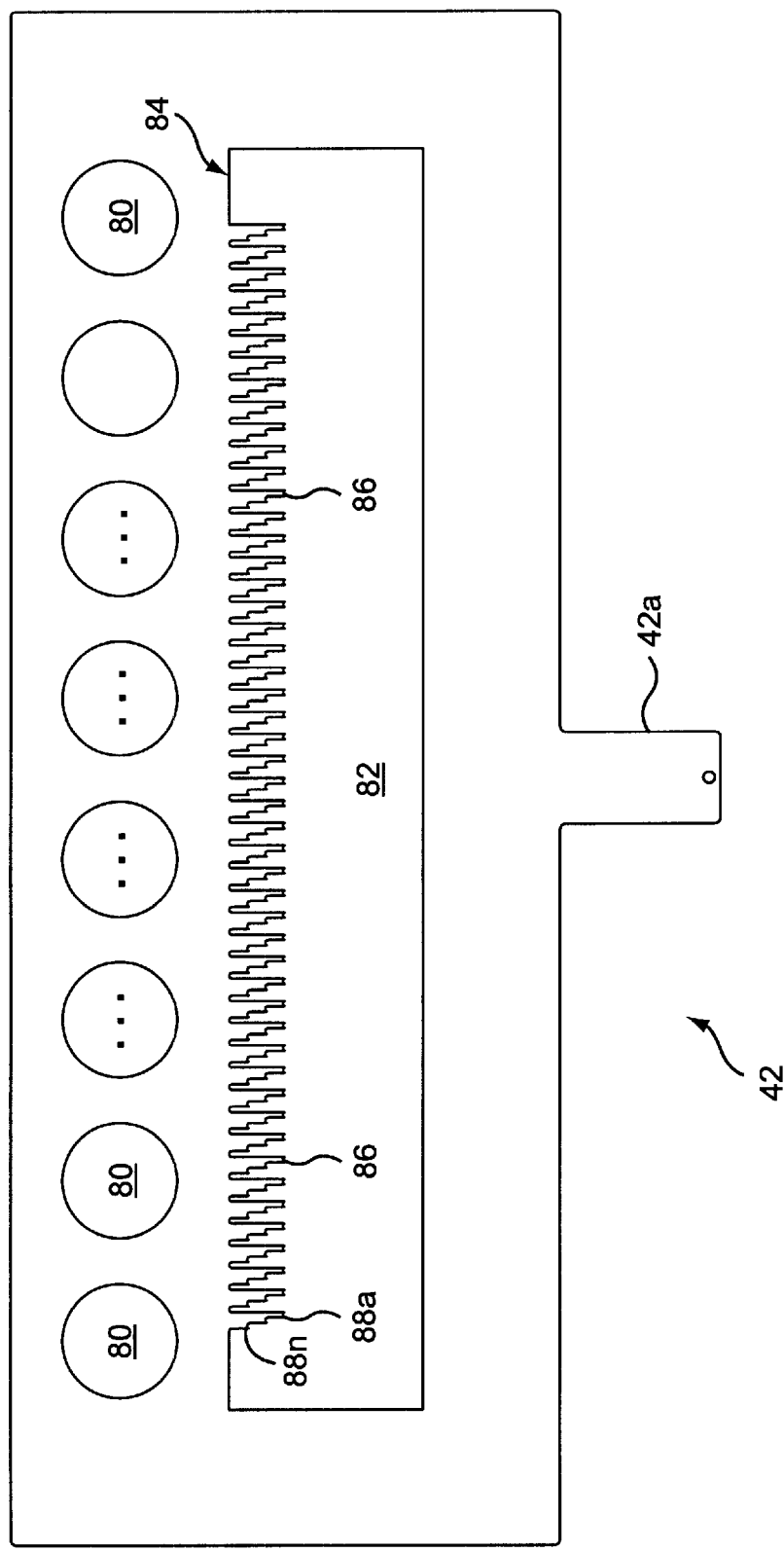
FIG. 3 is a front view of a first separator plate used in the weaving apparatus of the present invention.

Referring to FIG. 3, a front view of the first separator plate 42 used in the weaving apparatus 10 of the present invention is shown. The first separator plate 42 is rectangular in shape and includes a plurality of round recess regions 80 for reducing the weight of the plate and a rectangular shaped recess region 82. The top edge 84 of the recessed region 82 includes a series of downwardly protruding tube separating members 86. Each of the tube separating members 86 includes a set of N receptacles 88a–88n each configured to receive a heat exchanger tube. In the embodiment shown in FIG. 3, the number of receptacles 88 is four (N=4). The receptacles 88 are organized in a staggered pattern on each of the separating members 86. In various embodiments of the invention, the top plate 42 has a width ranging from 48 inches to 60 inches, a height ranging from 12 inches to 24 inches, and the top edge 84 includes anywhere from 50 to 100 tube separating members 86 and 2 to 8 receptacles 88 per tube separating member 86. A paddle-like member 42a extending from the alignment plate 42 is used to mechanically couple the separator plate 42 to the pneumatic cylinder 50 as best illustrated in FIG. 1A. The pneumatic cylinder 50 under control of switch 54b, moves the first separator plate 42 downward to the tube separating position so that the receptacles 88 of the tube separating members 86 can engage the tubes 14 of a heat exchanger or upward within the guide mechanisms 34 and 40 of the frame assembly 20 to the reset position.

Figure 4:
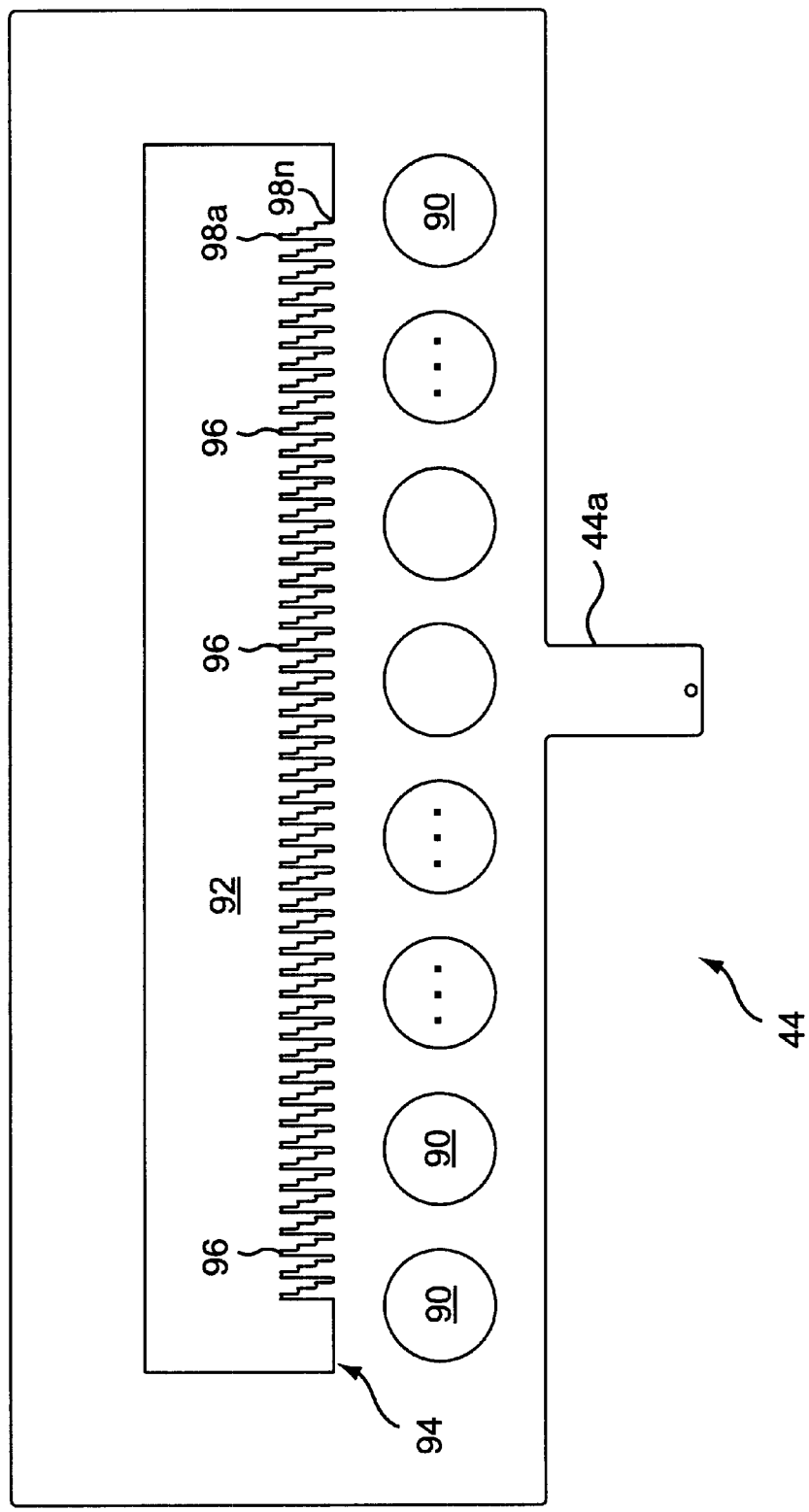
FIG. 4 is a front view of a second separator plate used in the weaving is apparatus of the present invention.

Referring to FIG. 4, a front view of the second separator plate 44 used in the weaving apparatus 10 of the present invention is shown. The second separator plate 44 is rectangular in shape and includes a plurality of round recess regions 90 for reducing the weight of the plate and a rectangular shaped recess region 92. The bottom edge 94 of the recessed region 92 includes a plurality of upwardly protruding tube separating members 96. Each of the tube separating members 96 includes a set of N receptacles 98a–98n. In the Embodiment shown in FIG. 4, the receptacles 98 on each of the separating members 96 are organized in a second staggered pattern that is the complement of the first staggered pattern of receptacles 88 on the tube separating members 86 of the first separator plate 42. In various embodiments of the invention, the second separator plate 44 has a width ranging from 48 to 60 inches and height ranging from 12 to 24 inches, the bottom edge 94 includes anywhere from 50 to 100 tube separating members 96 and 2 to 8 receptacles 98 per tube separating member 96. A paddle-like member 44a extending from the second separator plate is mechanically coupled to the pneumatic cylinder 48 as best illustrated in FIG. 1A. As previously noted, the pneumatic cylinder 48 causes the second separator plate 44, and consequently the receptacles 98 of the tube separating members 96 to be positioned upward in a the tube separating position or downward in a reset position within the guide mechanisms 34 and 40 of the frame assembly 20.

Figure 5:
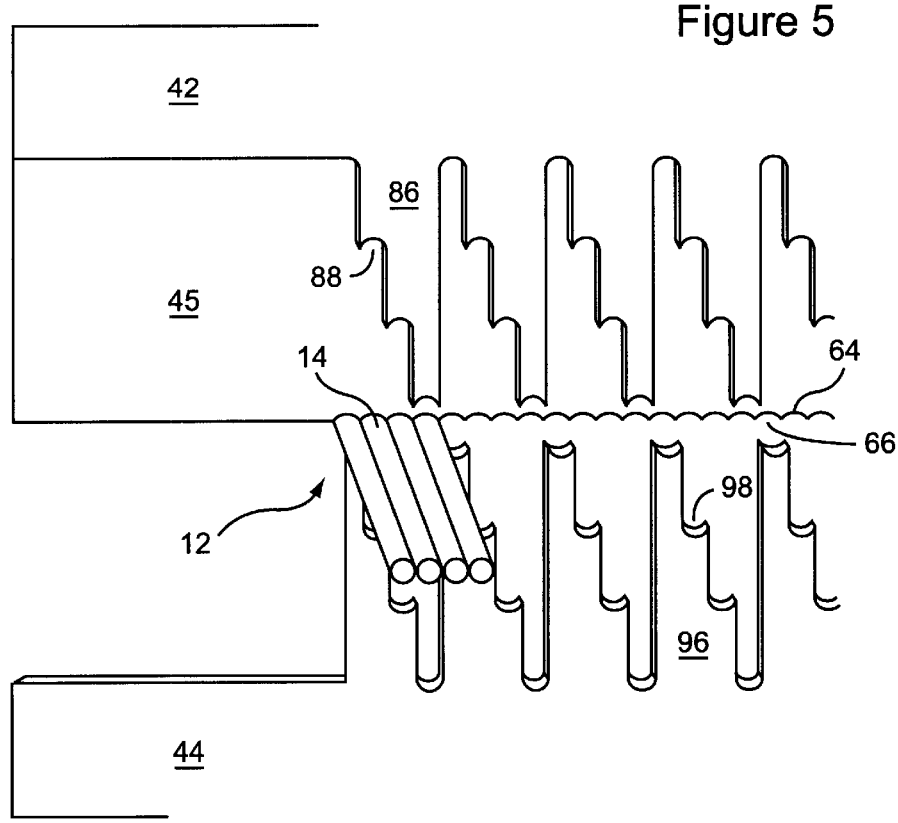
FIG. 5 is an exploded perspective view of the alignment plate aligning the tubes of the heat exchanger in the weaving apparatus.

Referring to FIG. 5, an exploded perspective view of the alignment plate 45, the first separator plate 42 and the second separator plate 44 is shown prior to a weaving operation. In preparation of the weaving operation, the switches 54b and 54a are activated by the operator to place the first separator plate 42 and the second separator plate 44 in their reset positions respectively. Specifically, the first separator plate 42 is raised and the second separator plate 44 is lowered within the guide mechanisms 34 and 40 of the frame assembly 20. The tubes 14 of a heat exchanger are then inserted through the recess regions 62, 82, 92 of the three plates 45, 42, and 44 respectively. For the sake of simplicity, only four of the tubes 14 of the heat exchanger are shown. Next the operator lowers the alignment plate 45 from its reset position into the alignment position so that the alignment notches 66 of the alignment edge 64 engage the tubes 14 of the heat exchange unit. If necessary, the operator may be required to move the tubes 14 so that they are inserted into the alignment notches 66. Once these steps are completed, the weaving apparatus 10 is ready to perform a weaving operation.

Figure 6:
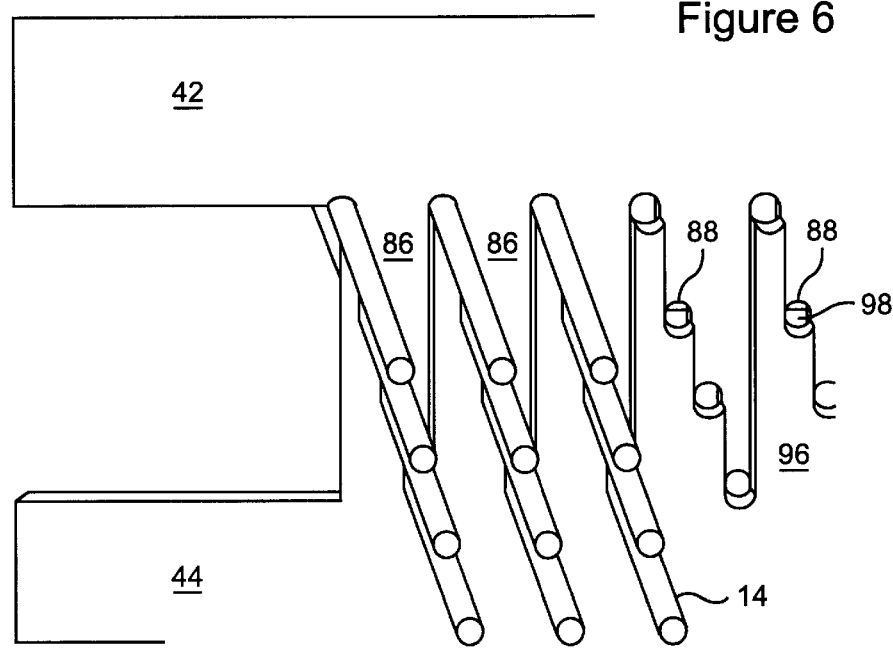
FIG. 6 is an exploded perspective view of the first separator plate and the second separator plate separating the tubes of the heat exchanger in the weaving apparatus of the present invention.

Referring to FIG. 6, an exploded perspective view of the first separator plate 42 and the second separator plate 44 after a weaving operation is shown. To begin a weaving operation, the operator is required to lower the first separator plate 42 into the tube separating position by activating switch 54b. When the first separator plate 42 is in the tube separating position, the lowest most receptacles 88a of each of the tube separating members 86 engages a tube 14 positioned within the corresponding alignment notches 66 of the alignment plate 45. The alignment plate 45 (not visible in FIG. 6) is then raised by activating switch 54c to its reset position so that it does not interfere with the remainder of the weaving operation. Next the second plate 44 is raised by the operator using switch 45a. As the second separator plate 44 moves upward within the guide mechanisms 34 and 40, the N receptacle 98 of each tube separation member 96 will engage successive tubes 14 of the heat exchanger and position them within the complementary receptacles 88 of the tube separation members 86 of the first separator plate 42. For the sake of clarity, FIG. 6 shows only twelve tubes 14 that have been separated. In an actual weaving operation, all of the tubes 14 of a heat exchanger are separated in a similar manner. It should be noted that in one embodiment, the tack welds between the tubes 14 are broken before the heat exchanger is inserted into the weaving apparatus 10. In an alternative embodiment, the tack welds are kept intact and then broken by the tube separation action of the first separator plate 42 and the second separator plate 44. After the separation operation is complete, the tubes 14 are arranged in N parallel planes. Each parallel plane is defined by a corresponding pair of the receptacles 88a–98a through 88n–98n of the tube separation members 86 and 96 respectively.

Figure 7:
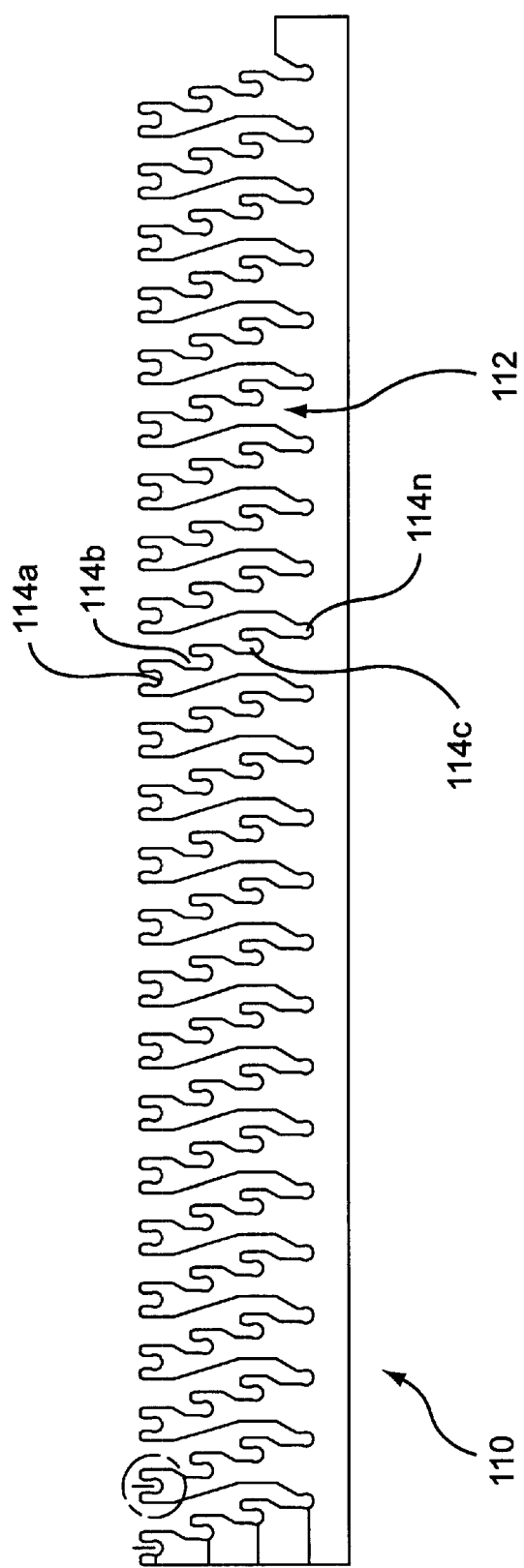
FIG. 7 is a spacer used to hold the tubes of the heat exchanger apart after the tubes are separated by the weaving apparatus of the present invention.

Referring to FIG. 7, a side view of a spacer that can be used to hold the tubes of the heat exchanger apart after the tubes 14 are separated by the weaving apparatus 10 is shown. The spacer 110 is an elongated structural member made of relatively stiff but flexible material such as plastic or metal. The spacer 110 includes a plurality of spacer members 112. Each spacer member 112 includes a plurality of spacer receptacles 114a–114n configured to receive and hold the tubes 14 of a heat exchanger 16. After the tubes 14 are separated, the operator inserts the spacer 110 within the weaving location 12 of the weaving apparatus 10 and then snaps the separated tubes 14 into the spacer receptacles 114 of the spacer 110 respectively. The tubes 14 are thus "locked" in place and held apart in N parallel planes by the spacer 110. Once this operation is complete, the weaving apparatus 10 is ready to perform another weaving operation at a second location on the tubes 14 of the heat exchanger by pulling the tubes through the weaving apparatus 10 to the second position or on a new heat exchanger. In one embodiment, multiple spacers are used different positions along the length of the tubes 14 of the heat exchanges.

Referring to FIG. 8, a number of embodiments for alternative spacers 110 is shown. These spacers 120 through 128 also each include N spacer receptacles 114a–114n configured to receive and secure the tubes 14 of a heat exchanger. These spacers 120 through 128 operate and have similar mechanical properties as spacer 110, and therefore will not be described in detail herein.

In yet another embodiment, two spacers 110 can be used to separate the tubes 14 of a heat exchanger at each weaving location. With this embodiment, the second spacer is positioned so that its spacer members 112 and receptacles 114 are diametrically opposed to those of the first spacer 110. As such, the receptacles 114 of both spacers engage the tubes 14 of the heat exchanger 10 from opposite sides.

While the invention has been described in relationship to the to the embodiments shown and described herein, other alternatives, embodiments, and modifications will be apparent to those skilled in the art. It is intended that the specification be only exemplary, and that the true scope and spirit of the invention be indicated by the following claims.

What is claimed is:

1. An apparatus comprising:
   a weaving mechanism configured to accept a heat exchanger comprising a plurality of connected parallel tubes, the weaving mechanism including:
      a first separator plate having a first set of receptacles arranged in a first staggered pattern, the first set of receptacles configured to engage one of the connected parallel tubes respectively; and
      a second separator plate having a second set of receptacles arranged in a second staggered pattern, the second staggered pattern arranged in the complement of the first staggered pattern the second set of receptacles configured to engage one of the connected parallel tubes respectively,
      wherein the first separator plate and the second separator plate act to separate the connected tubes into a staggered arrangement.

2. The apparatus of claim 1, wherein the weaving mechanism further comprises an alignment plate configured to align the tubes of the heat exchanger.

3. The apparatus of claim 2, wherein the alignment plate further comprises a plurality of alignment notches configured to align tubes of a heat exchanger in a predetermined position within the weaving mechanism.

4. The apparatus of claim 3, wherein the alignment notches on the alignment plate are shaped to engage tubes of a heat exchanger.

5. The apparatus of claim 2, further comprising a frame assembly, wherein the alignment plate is maintained within a guide mechanism within the frame assembly.

6. The apparatus of claim 5, wherein the alignment plate is configured to assume a first alignment position within the guide mechanism to facilitate the alignment of tubes of a heat exchanger and a second reset position within the guide mechanism when the alignment plate is not in position to align tubes of a heat exchanger.

7. The apparatus of claim 6, further comprising a first actuator mechanism mechanically coupled to the alignment plate and configured to selectively position the alignment plate between the first alignment position and the second reset position within the guide mechanism of the frame assembly.

8. The apparatus of claim 7, wherein the first actuator mechanism is a first pneumatic cylinder mechanically coupled to the alignment plate and a switch configured to selectively activate the first pneumatic cylinder to cause the alignment plate to move to either the first alignment position or the second reset position within the guide mechanism.

9. The apparatus of claim 1, wherein the first set of receptacles are arranged on a plurality of tube positioning members on the first separator plate.

10. The apparatus of claim 9, wherein each of the tube positioning members includes a subset of the first set of receptacles.

11. The apparatus of claim 10, wherein the sub-set of receptacles on each of the tube positioning members are arranged in the first staggered pattern.

12. An apparatus comprising:
a weaving mechanism configured to accept a heat exchanger comprising a plurality of parallel tubes and to separate the tubes of the heat exchanger simultaneously so that a spacer can be inserted between the tubes of the heat exchanger, the weaving mechanism comprising
a first separator plate with a first plurality of tube positioning members, wherein each of the first plurality of tube positioning members includes a first set of N receptacles each configured to receive one of the tubes of the heat exchanger, the first set of N receptacles of the first plurality of tube positioning members arranged in a first staggered pattern;
a second separator plate with a second plurality of tube positioning members, each of the second plurality of tube positioning members having a second set of N receptacles arranged in a second staggered pattern which is the complement of the first staggered pattern of the first separator plate, wherein the first set of N receptacles of the first plurality of tube positioning members of the first separator plate correspond to the second set of N receptacles of the second plurality of tube positioning members of the second separator plate respectively and wherein the first set of N receptacles of the first plurality of tube positioning members and the second set of N receptacles of the second plurality of tube positioning members are positioned adjacent one another in N substantially parallel planes when the first separator plate and the second separator plate are both in a tube separation position.

13. The apparatus of claim 12, wherein the weaving mechanism comprises a frame assembly having a guide mechanism wherein the first separator plate is secured within the guide mechanism of the frame assembly.

14. The apparatus of claim 13, wherein the second separator plate is secured within the guide mechanism of the frame assembly.

15. The apparatus of claim 14, further comprising an actuator mechanism mechanically coupled to the first plate and the second separator plate and configured to selectively position the first separator plate and the second separator plate in either the tube separation position or a reset position within the guide mechanism of the frame assembly.

16. The apparatus of claim 15, wherein the actuator mechanism comprises a first pneumatic cylinder mechanically coupled to the first separator plate and a first switch configured to selectively activate the first pneumatic cylinder to position the first separator plate to either the tube separation position or the reset position within the guide mechanism of the frame assembly.

17. The apparatus of claim 15, wherein the actuator mechanism comprises a second pneumatic cylinder mechanically coupled to the second separator plate and a second switch configured to selectively activate the second pneumatic cylinder to position the second separator plate to either the tube separation position or the reset position within the guide mechanism of the frame assembly.

18. The apparatus of claim 10, wherein the receptacles on the fist separator plate are shaped to engaged the tubes of a heat exchanger.

* * * * *